(12) United States Patent
Margolin et al.

(10) Patent No.: US 11,671,424 B2
(45) Date of Patent: Jun. 6, 2023

(54) MACHINE LEARNING TECHNIQUES FOR PERFORMING AUTHENTICATION BASED ON A USER'S INTERACTION WITH A CLIENT DEVICE

(71) Applicant: PayPal, Inc., San Jose, CA (US)

(72) Inventors: Itay Margolin, Pardesiya (IL); Tomer Handelman, Ramat-Gan (IL)

(73) Assignee: PayPal, Inc., San Jose, CA (US)

( * ) Notice: Subject to any disclaimer, the term of this patent is extended or adjusted under 35 U.S.C. 154(b) by 417 days.

(21) Appl. No.: 16/861,060

(22) Filed: Apr. 28, 2020

(65) Prior Publication Data

US 2021/0336952 A1 Oct. 28, 2021

(51) Int. Cl.
| | | |
|---|---|---|
| *H04L 9/40* | (2022.01) | |
| *G06Q 40/02* | (2023.01) | |
| *G06N 3/08* | (2023.01) | |
| *G06Q 50/26* | (2012.01) | |
| *G06N 3/04* | (2023.01) | |

(Continued)

(52) U.S. Cl.
CPC ........... *H04L 63/0876* (2013.01); *G06N 3/04* (2013.01); *G06N 3/045* (2023.01); *G06N 3/08* (2013.01); *G06Q 20/40* (2013.01); *G06Q 40/02* (2013.01); *G06Q 50/265* (2013.01); *H04L 63/102* (2013.01); *H04L 63/1425* (2013.01)

(58) Field of Classification Search
CPC ............... H04L 63/0876; H04L 63/102; H04L 63/1425; G06N 3/04; G06N 3/0454; G06N 3/08; G06Q 20/40; G06Q 20/321; G06Q 20/322; G06Q 20/4016; G06Q 20/405; G06Q 40/02; G06Q 50/265; G07F 9/001
See application file for complete search history.

(56) References Cited

U.S. PATENT DOCUMENTS

| | | | | |
|---|---|---|---|---|
| 2016/0092872 A1* | 3/2016 | Prakash | ............... | G06Q 20/322 705/65 |
| 2017/0262853 A1* | 9/2017 | Williamson | ........ | G06Q 20/4016 |
| 2019/0333167 A1* | 10/2019 | Valdhorn | ............. | G06V 10/764 |

OTHER PUBLICATIONS

Siamese neural network, Wikipedia; https://en.wikipedia.org/w/index.php?title=Siamese_neural_network&oldid=941099753; this page was last edited on Feb. 16, 2020, at 16:15 (UTC), 4 pages.

(Continued)

*Primary Examiner* — Khoi V Le

(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to machine learning techniques for performing user authentication based on the manner in which a user interacts with a client device, including the use of Siamese networks to detect unauthorized use of a device and/or account. In some embodiments, a server system may receive a request to authorize a transaction associated with a user account. The request may include transaction details and, separate from those transaction details, interaction data indicative of a manner in which a requesting user interacts with a client device during a user session. The server system may apply a machine learning model to the interaction data to create an encoding value that is based on the manner in when the requesting user interacts with the client device during the user session. The server system may then compare the encoding value to a reference encoding value and, based on the comparison, determine whether to authorize the transaction.

20 Claims, 9 Drawing Sheets

(51) Int. Cl.
    *G06Q 20/40*     (2012.01)
    *G06N 3/045*     (2023.01)

(56) References Cited

OTHER PUBLICATIONS

Triplet loss, Wikipedia; https://en.wikipedia.org/w/index.php?title=Triplet_loss&oldid=916491758; this page was last edited on Sep. 19, 2019, at 05:15 (UTC), 2 pages.

Todd Murray Studnicka et al., "Modification of User Account Functionality Based on a Physical State of a Mobile Device," U.S. Appl. No. 16/212,290, filed Dec. 6, 2018, 35 pages.

Siva Surya Teja Vanga et al., "Detecting Anomalous Transactions Using Machine Learning," U.S. Appl. No. 16/391,052, filed Apr. 22, 2019, 33 pages.

Yuan Deng et al., "Generation of User-Specific Time-to-Live Values Using Machine Learning," U.S. Appl. No. 16/732,055, filed Dec. 31, 2019, 33 pages.

\* cited by examiner

700

---

Receive a request to authorize a transaction associated with a first user account, where the request includes:

-Transaction details for the transaction; and
-Interaction data, separate from the transaction details, indicative of a manner in which a requesting user interacts with a first client device during a first user session
702

---

Apply a first machine learning model to the interaction data to create a first encoding value that is based on the manner in which the requesting user interacts with the first client device during the first user session
704

---

Compare the first encoding value to a reference encoding value, where the reference encoding value is based on prior interaction data indicative of a manner in which an authorized user of the first user account interacted with the first client device during a prior user session
706

---

Generate an output value indicating a similarity between the first encoding value and the reference encoding value
708

Access a training dataset that includes prior interaction data indicative of a manner in which a plurality of users interacted, during a plurality of prior user sessions, with a particular type of client device, where the training dataset includes a plurality of training examples, and where a given one of the plurality of training examples includes:

-A first sample indicative of user interaction by a first user during a first user session;
-A second sample indicative of user interaction by the first user during a second user session; and
-A third sample indicative of user interaction by a second user during a third user session
_802_

Train a machine learning model using the training dataset such that, after training, the machine learning model is operable to generate an encoding value based on a manner in which a given user interacts with the particular type of client device during a given user session
_804_

FIG. 8

MACHINE LEARNING TECHNIQUES FOR PERFORMING AUTHENTICATION BASED ON A USER'S INTERACTION WITH A CLIENT DEVICE

BACKGROUND

Technical Field

This disclosure relates generally to computer system security, and more particularly to machine learning techniques for performing authentication based on a user's interaction with a client device, according to various embodiments.

Description of the Related Art

Server systems utilize various techniques to limit unauthorized access to the computing resources they provide. For example, one technique for limiting access to a service is to require an end user to establish a user account and authentication credentials (e.g., a username and password), and to require end users to provide valid credentials to the server system prior to providing the user with access to the user account. In some instances, however, such user credentials may be discovered by a malicious third-party (e.g., through a phishing attack, brute-force attack, etc.), presenting security concerns. Once authenticated, the malicious third-party may access the service, including the various functionalities and features accessible to the user account, to the same extent as the authorized user. Applicant recognizes that preventing and mitigating effects of such unauthorized access is desirable for improving computer system security and functionality.

BRIEF DESCRIPTION OF THE DRAWINGS

FIGS. 6 and 7 are flow diagrams illustrating example methods for using machine learning techniques to perform authentication based on the manner in which a user interacts with a client device, according to some embodiments.

FIG. 8 is a flow diagram illustrating an example method for training a machine learning model, according to some embodiments.

DETAILED DESCRIPTION

Figure 1:
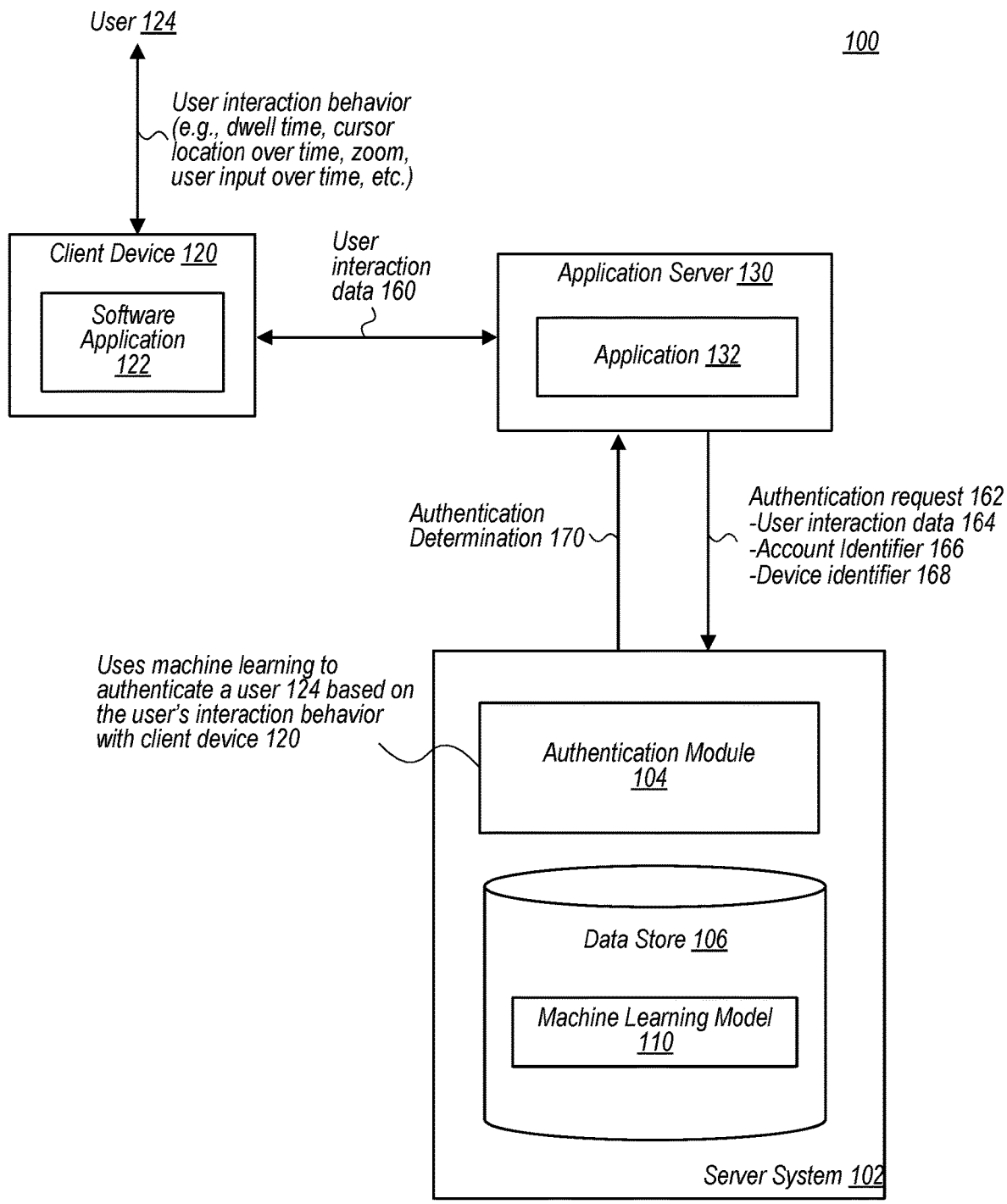
FIG. 1 is a block diagram illustrating an example server system operable to use machine learning techniques to authenticate a user based on the manner in which the user interacts with a client device, according to some embodiments.

Server systems often validate other authentication factors (e.g., instead of or in addition to validating a user's authentication credentials), such as possession or use of a verified device. A server system may verify (e.g., through device fingerprinting or other suitable techniques) that the client device used by a requesting user matches the client device that an authorized user has previously registered or used during prior user sessions. In many instances, proof that the requesting user is using an "authorized" device may be an important factor in determining whether to authenticate a requesting user or authorize an attempted transaction.

This approach also presents various technical shortcomings, however. Consider, for example, an instance in which someone other than the authorized user gains physical access to the authorized user's device. In one scenario (sometimes referred to as "friendly fraud"), an unauthorized user, such as a child, friend, or household member, will use the authorized user's device to access a service and perform various actions on the authorized user's behalf.

As a non-limiting example, a child may take a parent's smartphone and use it to perform a transaction (such as sending an email, making a purchase, etc.) without the parent's knowledge. A server system may be unable to detect that the attempted actions are being performed by an unauthorized user. In this example scenario, the user may provide valid authentication credentials (which may, for example, be stored and auto populated by the client device), using the client device typically used by the authorized user. The nature of the transaction may also not be so anomalous as to trigger any of the server system's authentication mechanisms to flag the transaction as potentially fraudulent. As such, the server system may be unable to detect that the actions are performed by an unauthorized user and authorize the requested transaction. Accordingly, as demonstrated by this non-limiting example, it can be difficult to detect and prevent unauthorized transactions when those transactions are performed using an authorized user's device. This negatively impacts the security and functionality of the server system and the computing services it provides.

In various embodiments, the disclosed systems and methods may solve these and other technical problems by enabling a computer system (e.g., a server system) to authenticate a user based on a manner in which the user interacts with his or her client device. Note that, in many instances, the manner in which a user interacts with his or her client device (e.g., smartphone, laptop, etc.) will be consistent from one user session to the next.

Consider, for example, a hypothetical user, User A, who, when accessing a web service via his laptop computer, exhibits various interaction behaviors, such as zooming in on the page in his browser, dwelling on a certain portion of the page, moving his cursor in a certain pattern, scrolling through the page at a certain speed, etc. In many instances, User A will interact with his client device (his laptop, in the current example) in the same or similar manner across sessions such that User A's interaction with the client device during a user session with the web service today is similar to User A's interaction with his client device during a user session with the web service from six months ago. In other words, the way in which a particular user interacts with a web service (e.g. an "interaction usage fingerprint") may be somewhat distinctive, compared to other users, in terms of viewing content and executing command functions.

Further, in many instances, the manner in which a given user interacts with a client device will also vary based on the type of that client device. For example, User A may exhibit different interaction behaviors when accessing a web service via his smartphone than when accessing the web service via his laptop. Additionally, note that, in many instances, the manner in which a user interacts with a particular type of client device will differ from user to user. For example, when a second hypothetical user, User B, accesses the web service via her laptop, she may exhibit interaction behaviors that differ in one or more regards from those of User A. As non-limiting examples, User B may not adjust the zoom on the browser, may scroll more quickly through the page, may dwell on different portions of the page, etc. Thus, in many instances, a user may interact with a particular type of client device in a consistent manner, and the particular interaction behaviors may vary from user to user. In other words, the different users may have different interaction usage fingerprints.

In view of this, various embodiments of the disclosed systems and methods utilize machine learning techniques to authenticate a user based on the manner in which the user interacts with their client device. For example, in some disclosed embodiments, a computer system (e.g., a server system) may receive a request to authorize a transaction associated with a first user account, where the request includes transaction details for the transaction and, separate from those transaction details, interaction data that is indicative of the manner in which the requesting user interacted with their client device during a user session (e.g., the session during which the requesting user initiated the transaction). As used herein, the term "transaction" broadly refers to any computing activity that requires authorization prior to completion. Non-limiting embodiments of transactions include accessing a user account, accessing or modifying data maintained by a server system, requesting a particular web resource, etc. Note that the transactions that may be performed via a given web service will vary depending on the nature of the web service. For example, in instances in which a server system provides email services, transactions may include accessing an email inbox, sending an email, etc. Further note that the term "transaction" may include computing activity that is financial or non-financial in nature. For example, in embodiments in which a server system provides an online payment service, the server system may be capable of performing both financial transactions (e.g., transferring funds) and transactions that are not inherently financial in nature (e.g., accessing a user account, modifying account information, etc.). Throughout this disclosure, the term "financial transaction" will be used to refer to a transaction that is financial in nature.

Consider, as one non-limiting example, an instance in which a user of a client device accesses a website that is usable to facilitate the purchase of various products. In this example, the user may initiate a financial transaction to purchase a particular item from a merchant for $100. The user may initiate the financial transaction (e.g., using a "checkout" feature of the website), causing transaction details for the transaction (e.g., purchase amount, product identifier, merchant identifier, payment method, etc.) to be sent to the merchant or other entity performing authorization for the transaction. During the user session in which the user initiates this financial transaction, he or she may exhibit various interaction behaviors, as noted above. The transaction details for the transaction may be distinguished from "interaction data," which, as used herein, refers to data, separate from the transaction details, that is indicative of a manner in which a user interacts with a client device during a given user session.

Stated differently, the term "interaction data" broadly refers to any information that can be gleaned regarding the user's behavior with a client device during a user session apart from the actual transaction details. Interaction data may include information indicative of various interaction behaviors of the user or the user session. Non-limiting examples of information that may be included in interaction data include: application data indicating one or more applications interacted with during a user session, network data indicating external resources accessed during a user session (e.g., webpage identifiers for webpages visited by a user during a user session), dwell time for a given webpage (e.g., amount of time the user spends on a given webpage or given portions of a webpage), dwell time for a given website (e.g., amount of time the user spends on various webpages while navigating through multiple webpages of a website), cursor location, which may be provided as a function of time (e.g., cursor location on a webpage every millisecond), user interface control commands, which may be provided as a function of time (e.g., zooming in or out on various portions of a webpage), user interface data commands, which may be provided as a function of time (e.g., cursor selections, characters entered via a keyboard, etc.), etc.

Note that interaction data may be provided using any of various suitable formats. For example, in some embodiments, interaction data is provided as a sequence of data representing actions performed by the user with corresponding timestamp information indicating the time at which a given action was performed. In some embodiments, each action represented in the interaction data may be encoded as a one-hot encoding vector. Further note that, in various embodiments, the amount of interaction data for a given user session may vary depending, for example, on the duration of the user session, the amount of user interaction with the client device during the user session, etc.

In various embodiments, the server system may apply a machine learning model to the interaction data to generate a first encoding value that is based on the manner in which the requesting user interacts with their client device during the first user session. The server system may then compare this first encoding value to a reference encoding value that was generated based on prior interaction data indicative of the manner in which an authorized user of the first account interacted with the first client device during a prior user session. Based on this comparison, the server system may generate an output value (also referred to as a "similarity score") that indicates a similarity between the first encoding value and the reference encoding value. The server system may then determine whether to authorize the transaction based on the similarity score. In one non-limiting implementation, for example, if the similarity score exceeds a predetermined threshold value, this may indicate that the requesting user interacted with the first client device in a manner similar to interactions with the first client device during prior user sessions and, as such, the requesting user is the authorized user of the user account. Once authenticated (either partially or entirely through the verification of the requesting user's interaction with his or her client device), the server system may authorize the transaction. If, however, the similarity score does not exceed the predetermined threshold value, this may indicate that the requesting user of the first client device is someone other than the authorized user. As such, the server system may then take one or more corrective actions, such as denying the transaction or initiating additional authentication operations.

The disclosed systems and methods provide various technical benefits according to various embodiments. For instance, consider again the example above in which a child obtains a parent's device and uses it to perform a transaction that is not inconsistent with prior transactions performed by the parent. Using prior techniques, a server system may be incapable of detecting this "friendly fraud" and authorize the transaction. In various embodiments, however, the disclosed techniques may be used to determine, based on the manner in which the child interacts with the parent's device, that the transaction is being performed by someone other than the authorized user and, as such, the server system may take an appropriate corrective action. Thus, in various embodiments, the disclosed systems and methods improve the security and functionality of the system and the computing services it provides. (Note that the above scenario is provided merely as one non-limiting example and is not intended to limit the scope of the present disclosure. Instead, the disclosed techniques may be used in various contexts to authenticate a user or authorize a requested transaction based on a manner in which the requesting user interacts with the client device. For example, in some embodiments, the disclosed systems and methods may be particularly useful to detect instances in which a user's device has been obtained (e.g., stolen, found) by a third-party or in instances in which a malicious third-party is remotely accessing a user's device.)

In FIG. 1, block diagram 100 depicts a server system 102 that includes an authentication module 104 and a data store 106. In various embodiments, authentication module 104 is operable to use machine learning techniques to authenticate a user based on the manner in which the user interacts with a client device. For example, in various embodiments, server system 102 may provide one or more computing resources (e.g., as part of a web service) that may be used directly by end users or that may be integrated with (or otherwise used by) web services provided by third parties. As one non-limiting example, server system 102, in some embodiments, provides an online payment service that may be used by end users to perform online financial transactions (e.g., sending or receiving funds) or utilized by merchants to receive funds from users during financial transactions. Note, however, that this embodiment is described merely as one non-limiting example. In other embodiments, server system 102 may provide any of various suitable web services. In still other embodiments, server system 102 is an authentication server that provides authentication services (e.g., for third-party web services) and does not necessarily provide any other web services. In the depicted embodiment, server system 102 provides authentication services for an application 132 hosted by application server 130.

FIG. 1 further includes client device 120 that is used by user 124. Client device 120 may be any of various suitable computing devices, such as a smartphone, laptop computer, desktop computer, tablet computer, etc. that user 124 may use to access application 132 hosted by application server 130. For example, in various embodiments, client device 120 executes a software application 122, such as a web browser or dedicated software application, usable to access one or more computing resources provided by application server 130, such as application 132. Note that, in various embodiments, application server 130 may be used to provide any of various suitable web services to end users, such as an email service, streaming media service, online retail store, etc.

While accessing the application 132, user 124 may exhibit various interaction behaviors. Non-limiting examples of such interaction behaviors may include navigating between webpages, scrolling within a webpage, moving a cursor to different locations over time, dwelling on certain portions of the webpage, providing user input (e.g., via a keyboard or other input device) over time, etc. In various embodiments, server system 102 is operable to utilize user interaction data, indicative of the manner in which user 124 interacts with client device 120 while accessing the web services provided by application server 130, to determine whether to authenticate the user 124 or to authorize one or more transactions attempted by the user 124. In some embodiments, server system 102 is operable to monitor the user 124's interaction behavior. For example, in instances in which a service provided by server system 102 is integrated into (or otherwise used by) the web services provided by application server 130, the webpages accessed by client device 120 while using those web services may include code (e.g., provided in JavaScript or in any other suitable format) that is operable to monitor the interaction behavior of user 124 and provide user interaction data indicative thereof to the application server 130 (as in the depicted embodiment) or directly to the server system 102. Note, however, that this embodiment is provided merely as one non-limiting example. In other embodiments, the interaction behavior of user 124 (as he or she interacts with the web services provided by application server 130) may be monitored by the application server 130 or by a software application executing on client device 120. Broadly speaking, in various embodiments, any suitable web-based or client-side code (or any combination thereof) may be used to monitor user interaction behavior of user 124 with client device 120 as he or she interacts with a web service provided by application server 130.

During a user session with application server 130, user 124 may attempt one or more transactions. In various embodiments, application server 130 may utilize server system 102 to authenticate the user 124 to a given user account prior to authorizing the attempted transaction. For example, in FIG. 1, application server 130 sends an authentication request 162 to server system 102 that includes user interaction data 164, an account identifier 164, and a device identifier 168. As described in more detail below with reference to FIG. 2, in various embodiments, server system 102 is operable to use machine learning techniques to authenticate the user 124 based on the user's interaction with client device 120. For example, in some embodiments, authentication module 104 is operable to use a machine learning model 110 to generate an encoding value using the user interaction data 164 such that the encoding value is based on the manner in which the user 124 interacts with client device 120 during the current user session. As used herein, the term "user session" refers broadly to a period of interaction between a client device and one or more computing resources of a server, such as application server 130 or server system 102. Note that a "user session" between a client and server may be independent of communication sessions established using one or more communication protocols to facilitate the "user session." For example, in some embodiments, an entire user session between client device 120 and application server 130 may occur during a single HTTP session between the two systems. In other embodiments, however, a user session between client device 120 and application server 130 may span multiple HTTP sessions.

In various embodiments, authentication module 104 may then compare this encoding value to one or more reference encoding values that are based on prior interaction data indicative of the manner in which an authorized user of the first user account interacted with the client device 120 during prior user sessions. Authentication module 104 may then determine whether to authenticate the user 124 (or authorize the transaction attempted by the user 124) based on an outcome of this comparison. For example, if the encoding value generated for the current user session is sufficiently similar (as discussed below) to the reference encoding value(s), this may indicate that the requesting user is interacting with client device 120 in a manner consistent with that in prior user sessions and, as such, that the user 124 is the authorized user. In such instances, the authentication module 104 may then authenticate the user 124 to a user account or authorize a requested transaction. If, however, the encoding value generated for the current user session is not sufficiently similar to the reference encoding value(s), this may indicate that the user 124 is not the authorized user and, accordingly, authentication module 104 may take one or more corrective actions such as denying the attempted transaction and initiating one or more additional authentication operations.

In the depicted embodiment, server system 102 is shown performing authentication operations for an application 132 hosted by a third-party application server 130. Note, however, that this embodiment is provided merely as one non-limiting example. In other embodiments, for example, server system 102 is operable to perform authentication operations for one or more software applications or web-based services hosted by application servers within the server system 102. For example, in some such embodiments, a user 124 of a client device 120 may interact directly with an application hosted by an application server within server system 102 and the authentication module 104 may determine whether to authenticate the user 124 based on the manner in which the user 124 interacts with the client device 120, as described herein. Further note that, although some embodiments of the disclosed techniques have been discussed with reference to determining whether to authorize a transaction attempted by a requesting user 124, the disclosed systems and methods are not limited to such embodiments. For example, in other embodiments, the disclosed techniques may be used to determine whether to authenticate a requesting user to a user account, independent of any attempted transactions, based on the manner in which the requesting user interacts with their client device during a current user session. As a non-limiting example, after a requesting user has been initially authenticated to a server system (e.g., using single- or multi-factor authentication techniques), the disclosed techniques may be applied during the course of a user session to further authenticate the user based on the manner in which the user interacts with the client device while accessing the computing resources provided by the server system.

Figure 2:
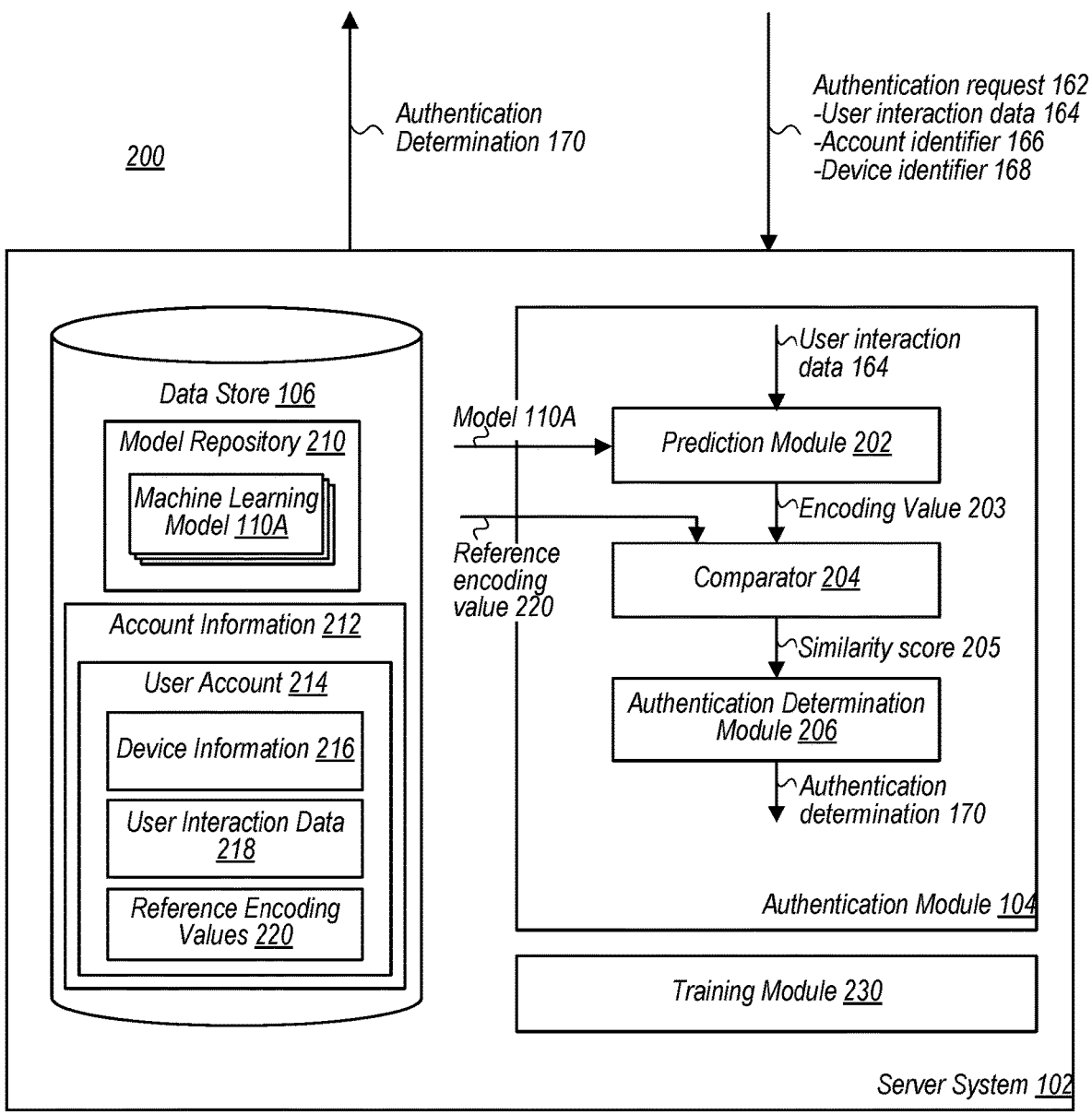
FIG. 2 is a block diagram illustrating an example server system, according to some embodiments.

Turning now to FIG. 2, a block diagram 200 illustrates an example server system 102, according to some embodiments. In the depicted embodiment, server system 102 includes authentication module 104, training module 230, and data store 106. Note that, in FIG. 2, although a single data store 106 is shown included within the server system 102, this simplified embodiment is provided merely as a non-limiting example. In other embodiments, server system 102 may include (or have access to) any suitable number of local or remote data stores, implemented using any suitable data storage technology.

In the depicted embodiment, data store 106 includes model repository 210, which includes various machine learning models 110. As explained in more detail below with reference to FIG. 4, each of the machine learning models 110 in the model repository 210 may be trained (e.g., by server system 102 using training module 230) based on training data associated with a particular type of client device. Machine learning models 110 may be built using any of various suitable learning algorithms. In some non-embodiments, for example, a machine learning model 110 may be a neural network, such as a Siamese neural network (sometimes referred to as a "twin neural network"), as described in more detail below with reference to FIG. 4. In embodiments in which a machine learning model 110 is a neural network, the model 110 may be implemented using any of various suitable neural network architectures. For example, in some embodiments, a neural network may be implemented using a feed-forward neural network architecture, such as a multi-layer perceptron ("MLP") architecture or a convolutional neural network ("CNN") architecture. In other embodiments, however, a Siamese neural network may be implemented using a recurrent neural network ("RNN"), such as a long short-term memory ("LS™") model. Note that these specific examples are provided merely as non-limiting embodiments, however, and that, in other embodiments, various suitable neural network architectures may be used, as desired.

Data store 106, in the depicted embodiment, further includes account information 212, which includes account information for various user accounts 214, including user account 214A that, in the embodiment of FIG. 2, the user 124 is attempting to access. In the depicted embodiment, the account information 212 for user account 214A includes device information 216, user interaction data 218, and reference encoding values 220. In various embodiments, device information 216 includes information indicative of the hardware or software characteristics of one or more client devices associated with user account 214. Non-limiting examples of such hardware and software characteristics include device type, operating system, installed software (e.g., type and version of browser used to access the web services), available hardware resources (e.g., system memory), etc. In various embodiments, authentication module 104 is operable to verify one or more items of device information included in the authentication request 162 against the device information 216 for the user account 214A. In some such embodiments, if the device information 168 associated with the client device 120 used during the current user session does not match device information 216 for the user account 214A, the authentication module 104 may take one or more corrective actions, such as denying the user 124 access to the user account 214A. If, however, the device information does match, the authentication module 104 may proceed as described below to determine whether to authenticate the user 124 based on the manner in which the user interacts with the client device 120.

In FIG. 2, account information 212 for user account 214A further includes user interaction data 218. In various embodiments, user interaction data 218 includes data indicative of the manner in which the user of user account 214A has interacted with his or her client device(s) during prior user sessions. In some embodiments, user interaction data 218 may include a time-series representation of the user's interaction with the client device 120 during prior user sessions. Further, in FIG. 2, account information 212 for user account 214A includes reference encoding values 220. In various embodiments, the reference encoding values 220 are generated based on the user interaction data 218 associated with prior user sessions. In the depicted embodiment, reference encoding values 220 are generated proactively (that is, prior to receiving an authentication request 162 associated with the user 124 attempting to access the user account 214A.) Note, however, that this embodiment is provided merely as one non-limiting example. In other embodiments, one or more reference encoding values 220 may be generated by authentication module 104 at or near the time of authentication (e.g., in response to receiving an authentication request 162 from application server 130).

Server system 102 further includes authentication module 104, which, in various embodiments, is operable to use machine learning techniques to determine whether to authorize a user 124 to a user account 214A based on the manner in which the user 124 interacts with the client device 120 during a current user session. For example, in the depicted embodiment, server system 102 receives, from application server 130, an authentication request 162 to authenticate user 124 of client device 120 to user account 214A. For example, as described above with reference to FIG. 1, user 124 of client device 120 may send a transaction request to the application server 130, which, in turn, may utilize server system 102 to determine whether to authorize the transaction requested by user 124. In the depicted embodiment, the authentication request 162 includes user interaction data 164, account information 166, and device information 168. As noted above, the disclosed techniques may be particularly useful in detecting instances of "friendly fraud" in which the user 124 is not the authorized user of account 214A but instead obtained the authorized user's client device 120 and authentication credentials (which may, for example, be stored and auto-populated by client device 120).

In the depicted embodiment, authentication module 104 includes prediction module 202, which, in various embodiments, is operable to generate an encoding value 203 that is based on the manner in which the user 124 interacts with the client device 120 during a current user session. For example, in various embodiments, authentication module 104 is operable to apply a machine learning model 110 to user interaction data 164 to generate encoding value 203. In various embodiments, encoding value 203 is a latent representation of the manner in which user 124 interacts with client device 120 during a current user session. Encoding value 203 may be provided in various suitable formats. For example, in some embodiments, encoding value 203 may be provided as a vector, the dimensions of which may be treated as a hyper-parameter of the machine learning model 110 that is adjusted during the training phase. As one non-limiting example, an example encoding value 203 provided as a 5-dimensional vector may be: [−0.35, 3.24, −2.45, −4.1, 8.53]. Note, however, that this example encoding value 203 is provided merely for the purposes of illustration and is not intended to limit the scope of the present disclosure.

As noted above, in various embodiments, a machine learning model 110 (such as model 110A of FIG. 2), may be specific to a particular type of device, such as a laptop computer, smartphone, tablet computer, smartwatch, etc. For example, in some embodiments, model repository 210 may include a machine learning model 110B that is specific to laptop computers, another machine learning model 110C that is specific to tablet computers, another machine learning model 110D that is specific to smartphones, etc. As described in more detail below with reference to FIG. 4, in such embodiments, a model 110 specific to a particular device type may be trained using training data that is also specific to that particular device type. For example, model 110B that is specific to laptop computers may be trained using training data indicative of the manner in which users interacted with their laptop computers during prior user sessions. Further, note that, in some embodiments, one or more of the machine learning models 110 in the model repository 210 may be specific to both hardware and software elements of the client device. For example, in some embodiments, model repository 210 may include a machine learning model 110 that is specific to Android™ OS-based smartphones, another machine learning model 110 that is specific to Apple™ iPhones, another machine learning model 110 that is specific to Windows' 10-based laptops, etc. Note, however, that the above embodiments are provided merely as non-limiting examples. In various embodiments, authentication module 104 is operable to determine a device type of client device 120 based on the device information 168 and retrieve a machine learning model 110 that is specific to the device type of client device 120. As one non-limiting example, consider an instance in which the client device 120 is an Apple™ iPhone. In such embodiments, authentication module 104 may retrieve machine learning model 110A that was trained based on user interaction data indicative of the manner in which various users interacted with Apple™ iPhones during prior user sessions.

Authentication module 104 of FIG. 2 further includes comparator 204, which, in various embodiments, is operable to compare the encoding value 203 (corresponding to the current user session) to one or more reference encoding values 220 and generate a similarity score 205. In various embodiments, similarity score 205 is indicative of a similarity between the encoding value 203 and the one or more reference encoding values 220. Comparator 204 may compare the encoding values 203 and 220 using any of various suitable techniques. For example, in one non-limiting embodiment, comparator 204 is operable to use the local outlier factor ("LOF") algorithm to compare the encoding values 203 and 220. As will be appreciated by one of ordinary skill in the art with the benefit of this disclosure, the LOF algorithm is an algorithm for identifying anomalous values by measuring the local deviation of a given value with respect to its neighbors. Note, however, that this embodiment is provided merely as one non-limiting example and, in other embodiments, various other suitable comparison algorithms may be used.

Authentication module 104 further includes authentication determination module 206, which, in various embodiments, is operable to determine whether to authenticate the requesting user 124 to user account 214A based on the similarity score 205. Stated differently, in various embodiments, authentication determination module 206 is operable to determine whether to authenticate the user 124 based on whether the encoding value 203 for the current user session is consistent with the reference encoding value(s) 220 corresponding to previous user sessions for that user account 214A. For example, in some embodiments, the authentication determination module 206 may determine whether to authenticate the user 124 to the user account 214A based on whether the similarity score 205 exceeds a predetermined threshold value. As a non-limiting example, consider an embodiment in which the similarity scores generated by comparator 204 are mapped to the range of 0.0-1.0, with larger values indicating a higher degree of similarity between the encoding value 203 and the reference encoding value(s) 220. In such an embodiment, if the similarity score 205 exceeds some predetermined threshold value (e.g., 0.40, 0.75, 0.80, 0.95, or some other value), authentication determination module 206 may determine that the user 124's interaction with client device 120 during the current user session is sufficiently similar to the interaction behavior of the user of account 214A during prior user sessions such that the requesting user 124 may be authenticated. If, however, the similarity score 205 does not (in this non-limiting embodiment) exceed this predetermined threshold value, authentication determination module 206 may determine that the user 124's interaction with client device 120 during the current user session is inconsistent with the interaction behavior of the authorized user of user account 214A during prior user sessions and, as such, the user 124 may not be authenticated. Further, note that, in various embodiments, the similarity score 205 may be one of multiple (potentially numerous) factors used to determine whether to authenticate the user 124 to the user account 214A.

In various embodiments, authentication determination module 206 may generate an authentication determination 170 specifying the outcome of this determination, which, in the depicted embodiment, may be provided back to application server 130 for use in determining whether to authorize the transaction attempted by the user 124. Note that, in various embodiments, authentication determination 170 may be expressed as a Boolean value, numerical value, or in any other suitable format that specifies the outcome of the authentication determination. Further note that the above embodiment (in which a higher similarity score is used to indicate a higher degree of similarity between encoding values 203 and 220) is provided merely as one non-limiting embodiments. Various other embodiments (such as embodiments in which a lower similarity score indicates a higher degree of similarity between encoding values) are contemplated and included within the scope of the present disclosure.

Figure 3:
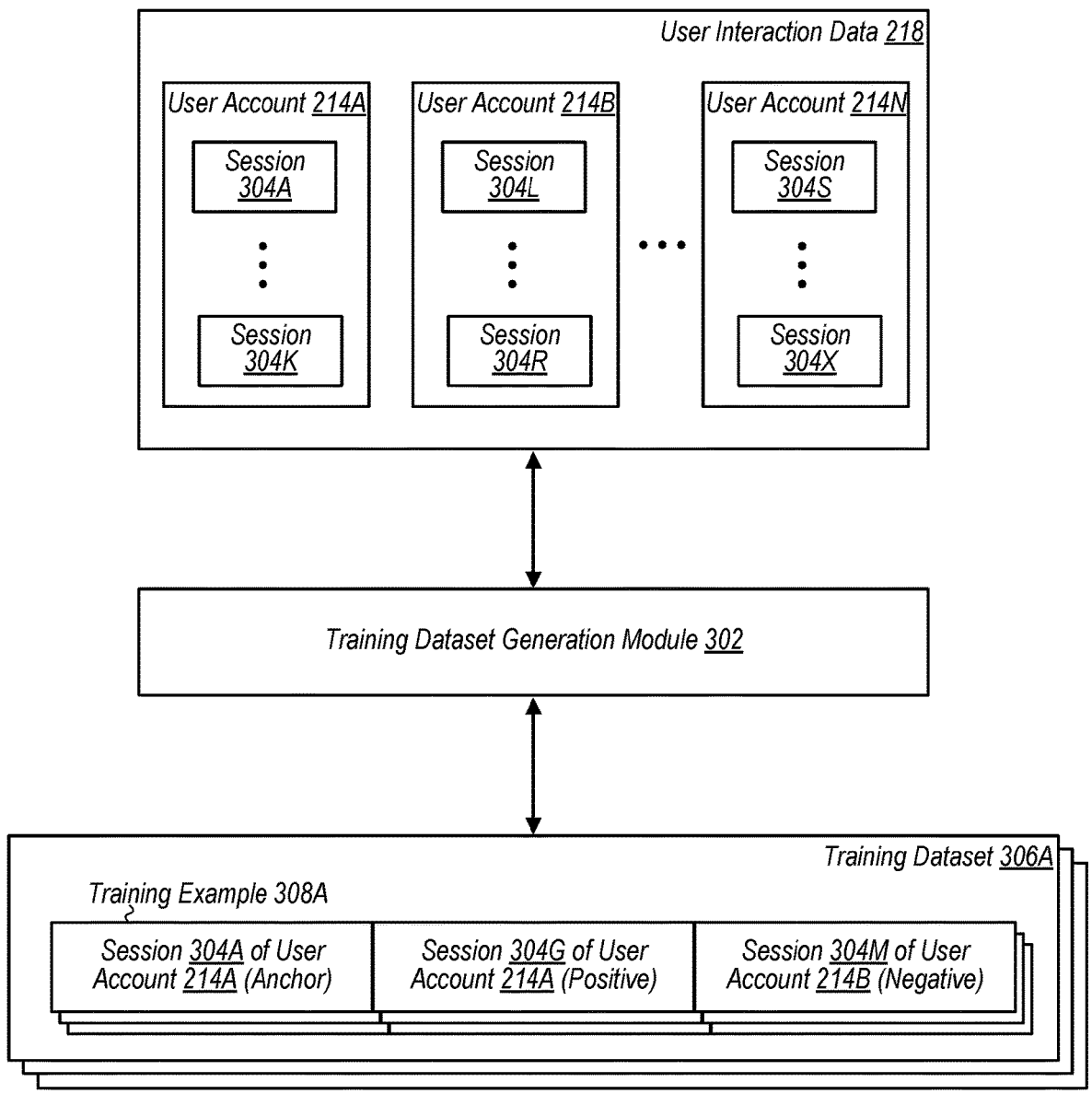
FIG. 3 is a block diagram illustrating an example training dataset generation module, according to some embodiments.

In FIG. 3, block diagram 300 depicts a training dataset generation module 302 that is operable to generate a training dataset 306 based on user interaction data 218 associated with various user accounts 214 during prior user sessions. As described in more detail below with reference to FIG. 4, a given training dataset 306 may be used to train one or more machine learning models 110 such that, once trained, the machine learning models 110 are operable to generate encoding values based on the manner in which a user interacts with a client device.

In FIG. 3, user interaction data 218 includes interaction data corresponding user sessions associated with various user accounts 214. For example, in the depicted embodiment, user interaction data 218 includes interaction data for user accounts 214A-214N. As indicated in FIG. 3, user interaction data 218 may include interaction data from multiple user sessions 304. For example, in FIG. 3, user interaction data 218 includes interaction data for user sessions 304A-304K associated with user account 214A, interaction data for user sessions 304L-304R associated with user account 214B, etc. Note that, although a single set of user interaction data 218 is shown in FIG. 3, this embodiment is provided merely as one non-limiting embodiment. For example, as described above, in some embodiments, one or more of the machine learning models 110 in model repository 210 may be specific to a particular device type (e.g., a laptop computer, a desktop computer, a smartphone, a tablet computer, etc.). In such embodiments, the machine learning models 110 may be trained using training datasets 306 that include user interaction data associated with the corresponding type of device. Accordingly, in some embodiments, server system 102 may include (or have access to) multiple sets of user interaction data 218, each of which is specific to a particular type of device. Alternatively, in some embodiments, user interaction data 218 may include, for a given user account 214, interaction data corresponding to sessions performed by multiple different devices, which may be of different device types. In some such embodiments, the interaction data associated with the sessions 304 may include an identifier to identify the device type used during a particular session 304.

In the depicted embodiment, training dataset 306 includes multiple training examples 308, each of which includes interaction data corresponding to multiple user sessions 304. For example, in the depicted embodiment, each training example 308 includes interaction data from three user sessions: two user sessions associated with the same user account and one user session associated with a different user account. For example, training example 308A includes user interaction data from: session 304A of user account 214A, session 304G of user account 214A, and session 304M of user account 214B. In various embodiments, constructing training examples 308 in this manner may be particularly useful for embodiments in which the machine learning model 110 is a Siamese neural network, as described in more detail below with reference to FIG. 4. Note that, in various embodiments, each of the training examples 308 in a given training dataset 306 include interaction data corresponding to interactions with a particular type of client device used during prior user sessions 304.

In various embodiments, training dataset generation module 302 is operable to generate dataset 306 by iteratively creating training examples 308 from user interaction data 218. In some embodiments, training dataset generation module 302 may start by filtering out user accounts 214 or sessions 304 based on various criteria. For example, in some embodiments, training dataset generation module 302 may filter out user accounts 214 for which there have not been a sufficient number of user sessions during a given time period (e.g., 100 user sessions during the last year) or user accounts 214 for which an instance of fraud has previously been reported or detected. Once it has performed in such filtering, training dataset generation module 302 may randomly (or pseudo-randomly) select a user session associated with a given user account 214$i$. This session 304 may be referred to as the "anchor session." Training dataset generation module 302 may then randomly (or pseudo-randomly) select a different user session 304 associated with the same user account 214$i$. This session 304 may be referred to as the "positive session." Training dataset generation module 302 may then randomly (or pseudo-randomly) select a user session 304 associated with a different user account 214$j$. This user session 304 may be referred to as the "negative session." The user interaction data for these three sessions may then be stored together (or otherwise associated with one another using, e.g., a table, index, or other suitable technique) as a training example 308.

In the embodiment in FIG. 3, for example, training dataset 306A includes training example 308A, which includes interaction data for user session 304A associated with user account 214A (the "anchor session"), interaction data for user session 304G associated with user account 214A (the "positive session"), and interaction data for user session 304M associated with user account 214B (the "negative session"). (Note, however, that this embodiment is provided merely as one non-limiting example. In other embodiments, interaction data corresponding to different numbers of user sessions 304 may be included in a given training example 308.) In various embodiments, training dataset generation module 302 may repeat this process—selecting an anchor session, a positive session, and a negative session—until it has generated a particular number of training examples (e.g., 1 million, 2 million, 5 million, etc.) to be included in the particular training dataset 306. Note that, in various embodiments, the number of training examples 308 included in a given training dataset 306 may vary depending, for example, on the availability of the user interaction data 218. As will be appreciated by one of skill in the art with the benefit of this disclosure, various other operations may be performed on a dataset 306 before it is used by training module 230 to train one or more machine learning models 110. For example, in various embodiments, one or more data scrubbing operations may be performed, for example to remove duplicate data, adjust the format of data, etc. Additionally, in various embodiments, a given dataset 306 may be split into multiple portions for use in different phases of the training process. One non-limiting approach, according to some embodiments, is to split a training dataset 306 into three portions—a training set (e.g., 70% of the total training dataset 306) used to build the machine learning model 110, a validation set (e.g., 15% of the training dataset 306) used to tune the model 110's hyper-parameters, and a test set (e.g., 15% of the training dataset 306) used to evaluate the performance of the model 110 prior to its use in determining whether to authenticate users, as described herein.

Figure 4:
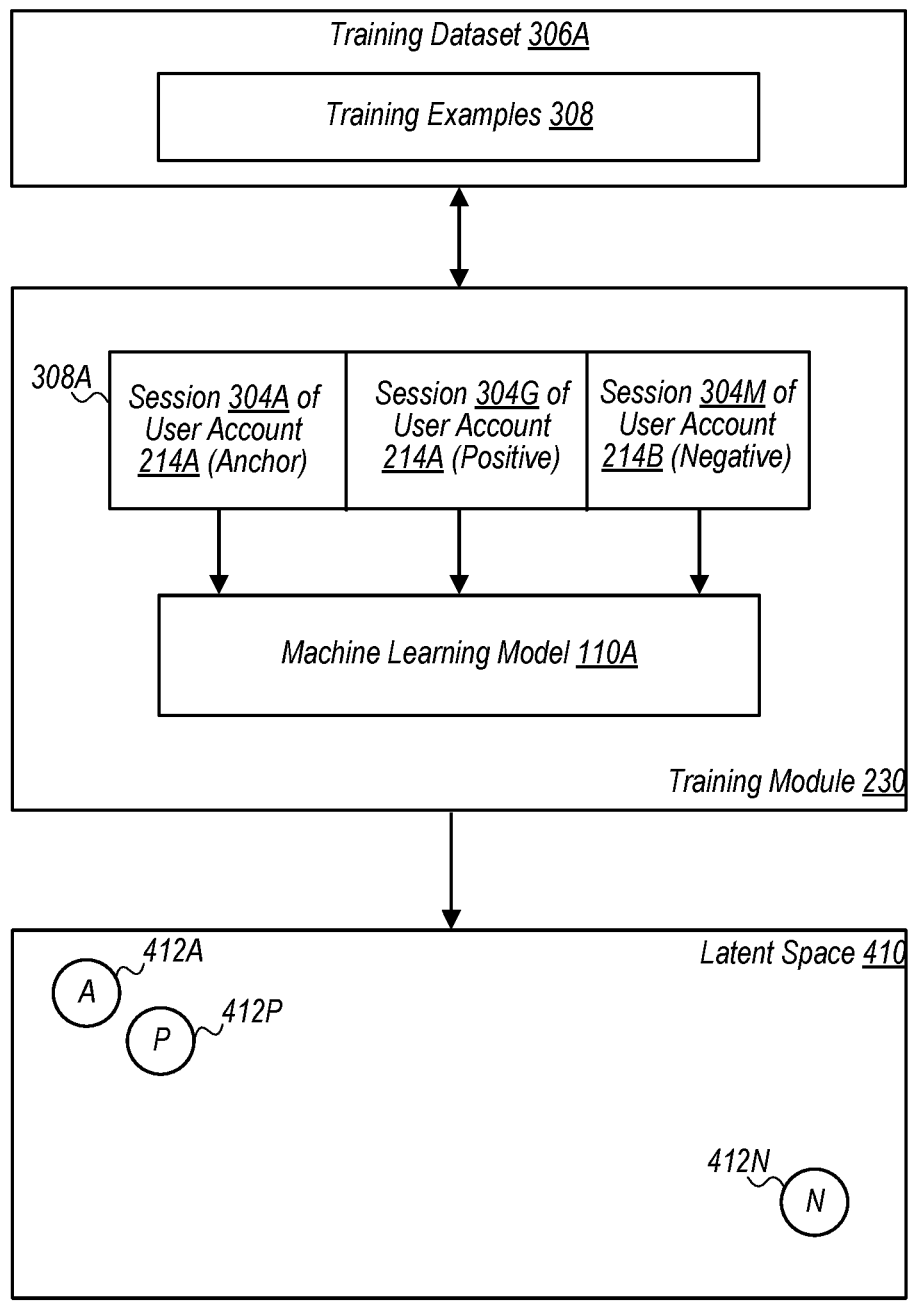
FIG. 4 is a block diagram illustrating an example training module operable to train one or more machine learning models, according to some embodiments.

In FIG. 4, block diagram 400 depicts a training module 230, training dataset 306, and latent space 410, according to some embodiments. In various embodiments, training module 230 is operable to train one or more machine learning models 110, using one or more training datasets 306, which may then be used to create encoding values (also referred to herein as "latent representations") based on user interaction data corresponding to the manner in which a user interacts with his or her client device during a user session. In various embodiments, once a machine learning model 110 is trained, it is operable to generate encoding values such that, given interaction data from different user sessions by the same user using the same client device, the trained machine learning model 110 will generate similar encoding values. Further, given interaction data from user sessions by different users using the same type of client device, a trained machine learning model 110, in various embodiments, will generate encoding values that are dissimilar. Stated differently, encoding values for the same user (from different sessions with the same client device) generated by a trained machine learning model 110 will be near one another when represented in a latent space (such as latent space 410 of FIG. 4) and encoding values for different users (using the same type of client device during their respective user sessions) generated by a trained machine learning model 110 will be farther from one another in the latent space.

In various embodiments, a given machine learning model 110 may be built using any of various suitable machine learning techniques and algorithms. As noted above, for example, machine learning model 110A may, in some embodiments, be a Siamese neural network implemented as an RNN (e.g., using a LSTM architecture), a feed-forward neural network (e.g., using an MLP or CNN architecture), or using any of various other suitable neural network architectures. As will be appreciated by one of skill in the art with the benefit of this disclosure, a Siamese neural network is an artificial neural network ("ANN") that use the same weights while working in tandem on two different input vectors to compute comparable output vectors. In various embodiments, the input to the Siamese neural network is the sequential user interaction data included in the training examples 308 of a training dataset 306. In FIG. 4, for example, the inputs to the machine learning model 110A are the training examples 308A-308N in the training dataset 306A.

In various embodiments, one or more of the machine learning models 110 may be optimized for a particular type of client device. To generate such a model 110, training module 230, in various embodiments, is operable to train the model 110 using a dataset 306 that includes interaction data from user sessions performed using that particular type of client device. For example, in the depicted embodiment, machine learning model 110A may be trained using training dataset 306A that includes training data from prior user sessions performed using smartphones such that, once trained, the model 110A is optimized to generate encoding values for user sessions performed using a smartphone.

Training a machine learning model 110 to be optimized for a particular type of client device may provide various technical benefits. For example, as described above, a given user may interact differently with different types of client devices. Accordingly, in some instances, relying on a single model 110 to generate encoding values, regardless of the type of client device used during the user session, may limit the ability to perform authentication based on the manner in which the user interacts with his or her client device. For instance, if a single model were used, encoding values based on user sessions for the same user would not necessarily be similar if those sessions were performed via different types of client devices. In various embodiments, however, by training and applying machine learning models 110 that are specific to different device types, the disclosed systems and methods are able to utilize an appropriate machine learning model 110 for a given authentication request (e.g., authentication request 162 of FIG. 1) and more reliably determine whether to authenticate a user based on the manner in which he or she interacts with a particular type of client device.

In various embodiments, training module 230 may train a machine learning model 110 using any of various suitable machine learning techniques to optimize various parameters of the model 110 such that, once trained, the model 110 is operable to generate encoding values that are similar for user sessions by the same user using the same client device and dissimilar for user sessions for different users, as described above. One non-limiting example of an optimization algorithm that may be used to optimize various parameters associated with a machine learning model 110 is the stochastic gradient descent ("SGD") algorithm, which may be used to optimize a cost function utilized by the training module 230. One non-limiting example of a cost function that may be utilized, in some embodiments, is the triplet loss function in which an anchor input value (e.g., an encoding value generated based on user interaction data from an "anchor session") is compared to a positive input (e.g., an encoding value generated based on user interaction data from a "positive session") and a negative input (e.g., an encoding value generated based on user interaction data from a "negative session"). In such embodiments, the SGD algorithm may be used to modify one or more of the model 110's parameters so as to minimize the distance (e.g., in the latent space 410) from the anchor input to the positive input and to maximize the distance from the anchor input to the negative input. (Note, however, that the above embodiments are merely non-limiting examples. In other embodiments, any suitable optimization algorithm or cost function may be used by training module 230 to train one or more machine learning models 110.)

For example, FIG. 4 includes latent space 410, which depicts three icons (412A, 412P, and 412N) representing three encoding values generated by machine learning model 110A based on a given training example 308A. More specifically, 412A represents an encoding value generated based on the anchor session in the training example 308A, 412P represents an encoding value generated based on the positive session, and 412N represents an encoding value generated based on the negative session. In FIG. 4, the respective locations of the encoding values 412 in the latent space 410 indicate the similarity of the encoding values relative to one another. Through the training process, training module 230 is operable to modify the parameters of the model 110A (e.g., a Siamese neural network) so as to minimize the distance between 412A and 412P while maximizing a distance between 412A and 412N. (As will be appreciated by one of skill in the art with the benefit of this disclosure, the two-dimensional visualization of latent space 410 is provided merely as one non-limiting example to facilitate discussion of some embodiments. As noted above, in various embodiments, encoding values 203 may be provided as a vector having any suitable number of dimensions. In some embodiments, for example, an encoding value 203 may be a vector having a much higher number of dimensions (e.g., 10, 50, 100, 1000, etc.). Further, note that the number of dimensions in the encoding values 203 (that is, the size of the vector) may be a hyper-parameter of the machine learning model 110 that may be adjusted as desired, for example during a training phase.)

Figure 5A:
FIGS. 5A-5B are block diagrams illustrating example depictions of encoding values in a latent space, according to some embodiments.
Figure 5B:

FIGS. 5A-5B are block diagrams illustrating example representations of encoding values in latent spaces 500 and 550, according to some embodiments. More specifically, FIG. 5A depicts icons corresponding to five encoding values. In the depicted embodiment, icons R1-R4 represent four reference encoding values 220 generated, by authentication module 104 using a machine learning model 110, based on interaction data from four sessions associated with a particular user account. Further, in the depicted embodiment, icon C represents an encoding value 203 generated, by authentication module 104 using the same machine learning model 110, based on user interaction data 164 from the authentication request 162 of FIGS. 1-2. Note that, in FIG. 5A, the five encoding values are located relatively close to one another in the latent space, indicating that the encoding values are relatively similar to one another. This, in turn, may indicate that the manner in which the requesting user 124 interacted with his or her client device 120 during a current user session is consistent with the manner in which the authorized user of user account 214A interacted with the client device 120 during prior user sessions.

In FIG. 5B, by contrast, note that the encoding value C based on interaction data for the current user session is located relatively far from the encoding values R1-R4 based on interaction data from the previous user session, indicating that the encoding value C is not similar to the encoding values R1-R4. This, in turn, may indicate that the manner in which the requesting user 124 interacted with the client device 120 during the current user session is inconsistent (in one or more regards) with the manner in which an authorized user of user account 214A interacted with the client device during the prior user sessions.

Example Methods

Figure 6:
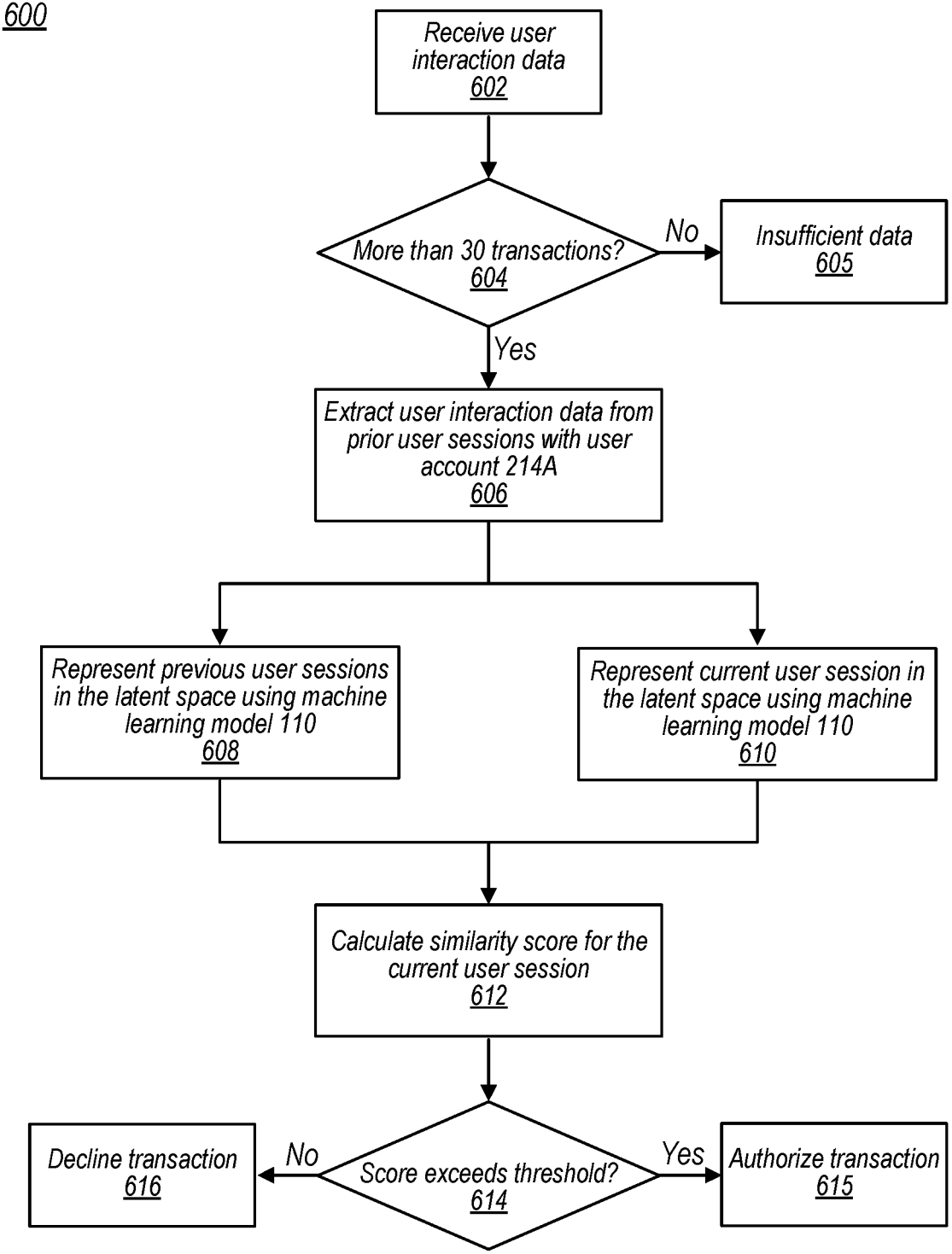

Referring now to FIG. 6, a flow diagram illustrating an example method 600 for using machine learning techniques to perform authentication based on the manner in which a user interacts with a client device is depicted, according to some embodiments. In various embodiments, method 600 may be performed by authentication module 104 of FIGS. 1-2 to determine whether to authorize a transaction attempted by a user 124 associated with a user account 214A. For example, server system 102 may include (or have access to) a non-transitory, computer-readable medium having program instructions stored thereon that are executable by one or more computers (e.g., hosts) within server system 102 to cause the operations described with reference to FIG. 6. In FIG. 6, method 600 includes elements 602-616. While these elements are shown in a particular order for ease of understanding, other orders may be used. In various embodiments, some of the method elements may be performed concurrently, in a different order than shown, or may be omitted. Additional method elements may also be performed as desired. Any computer system may execute all or a portion of method 600 according to various embodiments.

At 602, in the illustrated embodiment, the authentication module 104 receives user interaction data. For example, as discussed above with reference to FIG. 2, authentication module 104 may receive the user interaction data 164 that is indicative of the manner in which user 124 interacted with client device 120 during a user session in which the user 124 accessed computing resources provided by application server 130. In the example discussed above, for instance, the user 124 is attempting to access user account 214A such that he or she may perform one or more transactions via account 214A. Method 600 then proceeds to element 604, at which the authentication module 104 determines whether the user account 214A (to which the user 124 is to be authenticated) has performed more than a threshold number of transactions over a given time period. In method 600, authentication module 104 determines whether more than 30 transactions have been performed via user account 214A. Note, however, that this example is provided merely as one non-limiting embodiment and, in other embodiments, any suitable threshold number of transactions may be used. If, at element 604, authentication module 104 determines that the user account 214A has not been used to perform more than 30 transactions, method 600 proceeds to element 605, at which the authentication module 104 determines that there is an insufficient amount of data associated with the user account 214A at this time to authenticate the user 124 based on the manner in which the user 124 interacted with client device 120.

If, however, authentication module 104 determines that the user account 214A has been used perform at least 30 transactions (or some other particular number), method 600 proceeds to element 606, in which the authentication module 104 extracts user interaction data from prior user sessions with user account 214A. For example, authentication module 104 may retrieve user interaction data 218 associated with user account 214A from one or more data stores 106 that are included in (or accessible, e.g., via one or more network connections, to) server system 102. Method 600 then proceeds to elements 608 and 610. At 608, in the illustrated embodiment, the authentication module 104 represents the previous user sessions in the latent space (e.g., latent space 500 of FIG. 5A) using a machine learning model 110. Stated differently, prediction module 202 may generate one or more reference encoding values 220 based on user interaction data 218 corresponding to the previous user sessions associated with user account 214A. At 610, in the illustrated embodiment, the authentication module 104 represents the current user session in the latent space using the same machine learning model 110. Stated differently, prediction module 202 may generate an encoding value 203 corresponding to the current user session based on the user interaction data 164 included in the authentication request 162.

Method 600 then proceeds to element 612, at which the authentication module 104 calculates a similarity score for the current user session. For example, as discussed above with reference to FIG. 2, comparator 204 may generate a similarity score indicating a similarity between encoding value 203 for the current user session and one or more reference encoding values 220 for the previous user sessions. In some embodiments, authentication module 104 may use the LOF algorithm to generate the similarity score.

Method 600 then proceeds to element 614, in which the authentication module 104 determines whether the similarity score exceeds a particular threshold value. The particular threshold value may vary according to different embodiments depending, for example, on the algorithm used to compare the encoding values, the perceived risk associated with the requested transaction, the perceived risk associated with the user account 214A, or any of various other suitable considerations. If, at element 614, authentication module 104 determines that the similarity score does exceed the particular threshold value, method 600 proceeds to element 615, at which the authentication module 104 authorizes the transaction. As discussed above, in various embodiments, a determination that the similarity score exceeds a particular threshold value may, in some embodiments, be used as one of multiple factors in determining whether to authorize a transaction requested by user 124 or whether to authenticate the user 124 to the user account 214A. If, however, authentication module 104 determines that the similarity score does not exceed the particular threshold value, method 600 proceeds to element 616, at which the authentication module 104 determines that the requested transaction should be declined.

Referring now to FIG. 7, a flow diagram illustrating another example method, method 700, for using machine learning techniques to perform authentication based on the manner in which a user interacts with a client device is depicted, according to some embodiments. In various embodiments, method 700 may be performed by authentication module 104 of FIGS. 1-2 to determine whether to authenticate a requesting user 124 to user account 214A. For example, server system 102 may include (or have access to) a non-transitory, computer-readable medium having program instructions stored thereon that are executable by one or more computers (e.g., hosts) within server system 102 to cause the operations described with reference to FIG. 7. In FIG. 7, method 700 includes elements 702-708. While these elements are shown in a particular order for ease of understanding, other orders may be used. In various embodiments, some of the method elements may be performed concurrently, in a different order than shown, or may be omitted. Additional method elements may also be performed as desired.

At 702, in the illustrated embodiment, the authentication module 104 receives a request to authorize a transaction associated with a first user account. In the depicted embodiment, the request includes transaction details for the transaction, and interaction data, separate from the transaction details, that are indicative of the manner in which a requesting user interacts with a first client device during a first user session. For example, as described above with reference to FIG. 1, user 124 of client device 120 may access one or more computing resources provided by application server 130 (which may be associated with or separate from server system 102). During the course of the user session, user 124 may request a transaction be performed by application server 130, which may utilize authentication module 104 to determine whether to authenticate the user 124 to the user account 214A and, optionally, whether to authorize the transaction. In non-limiting embodiments, the interaction data may include one or more of the following types of interaction data: information indicative of the dwell time, during the first user session, on a particular portion of the webpage, information indicative of a cursor position on the webpage during the first user session, and information indicative of user input provided via the webpage during the first user session.

At 704, in the illustrated embodiment, the authentication module applies a first machine learning model to the interaction data to create a first encoding value that is based on a manner in which the requesting user interacts with the first client device during the first user session. As discussed above with reference to FIG. 3, for example, prediction module 202 may apply a machine learning model 110, from model repository 210, and apply it to the user interaction data 164 included in the authentication request 162 to generate an encoding value 203, according to some embodiments. In such embodiments, the encoding value 203 is based on the manner in which the user 124 interacts with the client device 120 during the session with the application server 130. In some embodiments, the first machine learning model may be a Siamese artificial neural network.

At 706, in the illustrated embodiment, the authentication module compares the first encoding value to a reference encoding value that is based on prior interaction data indicative of a manner in which an authorized user of the first user account interacted with the first client device during a prior user session. For example, in some embodiments, comparator 204 may compare encoding value 203 to one or more reference encoding values 220. Note that, in various embodiments, the one or more reference encoding values 220 may be generated at or near the time of authentication, for example subsequent to receiving the request to authorize the transaction. In other embodiments, however, one or more reference encoding values 220 may be generated proactively prior to receiving the request to authenticate the user to the user account.

At 708, in the illustrated embodiment, the authentication module generates an output value indicating a similarity between the first encoding value and the reference encoding value. For example, in some embodiments, comparator 204 may generate a similarity score 205 using any of various suitable techniques. In one non-limiting embodiment, the comparator 204 may use the LOF algorithm to compare the encoding value 203 to the one or more reference encoding values 220. In various embodiments, the output value (also referred to herein as a "similarity score"), may be used (potentially as one of multiple factors) to determine whether to authorize the transaction requested by user 124. In some embodiments, for example, method 700 may further include determining that the output value is below a particular threshold value and, in response to this determination, deny the transaction.

As discussed above, in some embodiments, one or more of the machine learning models 110 may be specific to a particular type of client device. In some such embodiments, method 700 may include identifying a device type of the first client device (e.g., client device 120) and retrieving the first machine learning model (e.g., model 110A), from a plurality of models, based on the device type of the first client device. In such embodiments, the first machine learning model may be trained, prior to the first user session, using a training dataset that includes second interaction data indicative of a manner in which a plurality of users interacted, during a plurality of prior user sessions, with client devices of the same device type as the first client device.

As described above with reference to FIG. 3, in some embodiments, method 700 may include generating one or more training datasets that may be used to train one or more machine learning models. For example, in some embodiments, method 700 includes generating a training dataset that includes second interaction data indicative of the manner in which a plurality of users interacted, during a plurality of prior user sessions, with client devices of a same device type as the first client device. In such embodiments, the training dataset include a plurality of training examples (e.g., training examples 308 of FIG. 3), where a given one of the training examples includes a plurality of samples of interaction data corresponding to a second user (e.g., user account 214B), and at least one sample of interaction data corresponding to a third user (e.g., user account 214C). Further, in some embodiments, method 700 may include training the first machine learning model based on the training dataset using the triplet loss cost function, as described above.

Referring now to FIG. 8, a flow diagram illustrating an example method 800 for training a machine learning model is depicted, according to some embodiments. In various embodiments, method 800 may be performed by training module 230 of FIGS. 2 and 4. For example, server system 102 may include (or have access to) a non-transitory, computer-readable medium having program instructions stored thereon that are executable by one or more computers (e.g., hosts) within server system 102 to cause the operations described with reference to FIG. 8. Further note that, in some embodiments, training operations (such as method 800) may be performed by a system other than server system 102 and, once trained, one or more machine learning models 110 may be provided to the server system 102 for subsequent use in determining whether to authenticate users. In FIG. 8, method 800 includes elements 802-804. While these elements are shown in a particular order for ease of understanding, other orders may be used. In various embodiments, some of the method elements may be performed concurrently, in a different order than shown, or may be omitted. Additional method elements may also be performed as desired.

At 802, in the illustrated embodiment, a training module accesses a training dataset that includes prior interaction data indicative of a manner in which a plurality of users interacted, during a plurality of prior user sessions, with a particular type of client device. For example, as described above with reference to FIG. 4, in some embodiments, the training module 230 may access a training dataset 306A that includes interaction data indicative of a manner in which users interacted with a particular type of client device (e.g., smartphones) during prior user sessions. In various embodiments, the training dataset includes a plurality of training examples, where a given one of the training examples includes: a first sample indicative of user interaction by a first user (e.g., a user associated with user account 214A) during a first user session (e.g., session 304A), a second sample indicative of user interaction by the first user during a second user session (e.g., session 304G), and a third sample indicative of user interaction by a second user (e.g., a user associated with user account 214B) during a third user session (e.g., session 304M).

At 804, in the illustrated embodiment, the training module trains a machine learning model using the training dataset such that, after training, the machine learning model is operable to generate an encoding value based on a manner in which a given user interacts with the particular type of client device during a given user session. In some embodiments, the machine learning model is an artificial neural network, where training the machine learning model includes using the triplet loss cost function to modify one or more parameters of the machine learning model, for example as described above with reference to FIG. 4. In some such embodiments, for a given training example, element 804 includes generating output values based on the first, second, and third samples, and modifying at least one of the one or more parameters so as to minimize the distance between the output values based on the first and second samples (e.g., encoding values generated based on the anchor and positive sessions, respectively) while maximizing a second distance between the output values based on the first and third samples (e.g., encoding values generated based on the anchor and negative sessions, respectively).

In some embodiments, subsequent to training the machine learning model, method 800 includes generating a reference encoding value (e.g., reference encoding value 220) associated with a first user account. In some embodiments, generating a reference encoding value 220 includes applying the machine learning model to first interaction data indicative of the manner in which an authorized user of the first user account interacted with the first client device during a first user session, where the first client device is of the particular type of client device. Further, in some embodiments, method 800 may include receiving an authentication request to authenticate a requesting user of the first client device to the first user account, where the authentication request includes second interaction data indicative of a manner in which the requesting user interacts with the first client device, and applying machine learning model to the second interaction data to generate a current encoding value that is based on the manner in which the requesting user interacts with the first client device. In some such embodiments, determining whether to authenticate the requesting user to the first user account includes comparing the current encoding value to the reference encoding value associated with the first user account, generating an output value indicating a similarity between the current in reference encoding values, and then determining whether the output value is below a particular threshold value.

Note that, in some embodiments, training module 230 is operable to train multiple different machine learning models. For example, in some embodiments, method 800 includes accessing a second training dataset that includes second interaction data indicative of a manner in which a second plurality of users interacted with a second type of client device during a second plurality of user sessions. In some such embodiments, method 800 may include training a second machine learning model using the second training dataset such that, after training, the second machine learning model is operable to generate a second encoding value that is based on a manner in which a given user interacts with the second type of client device during a second given user session.

Various embodiments have been described with reference to machine learning models 110 that are specific to a particular type of client device. Note, however, that the present disclosure is not limited to such embodiments. In some embodiments, the disclosed systems and methods may utilize machine learning models that (instead of or in addition to being specific to a particular type of client device) are specific to one or more other characteristics. For example, in some embodiments, the disclosed techniques may be used to train one or more models 110 that are specific to a particular geographic region based on training data from prior user sessions with users in that geographic region. In some such embodiments, when the server system 102 then receives an authentication request for a client device in a particular region, the authentication module 104 may utilize a machine learning model 110 that is specific to that particular region (and, optionally, specific to the device type of the client device). Further note that, in various embodiments, the disclosed systems and methods may be used to perform authentication based on user interaction with a wide range of different types of client devices, rather than solely based on user interaction with computing devices such as laptop computer, desktop computers, smartphones, tablet computers, etc. For example, in various embodiment, the disclosed systems and methods may be used to authenticate a user based on the manner in which the user interacts with any type of client device for which interaction data may be gathered. As a non-limiting example, the disclosed techniques, provided the appropriate interaction data, may be used to authenticate the driver of a vehicle based on the manner in which the driver drives with the vehicle (the "client device," in this example). Such an embodiment may be particularly useful to detect instances in which a vehicle is being stolen by determining that the manner in which the current driver is driving the vehicle is inconsistent with the manner in which the authorized driver (e.g., the owner) has driven the vehicle in the past. Broadly, the disclosed systems and methods may be used to authenticate a user based on the manner in which the user interacts with a client device regardless of the exact nature of the client device, according to some embodiments.

Example Computer System

Figure 9:
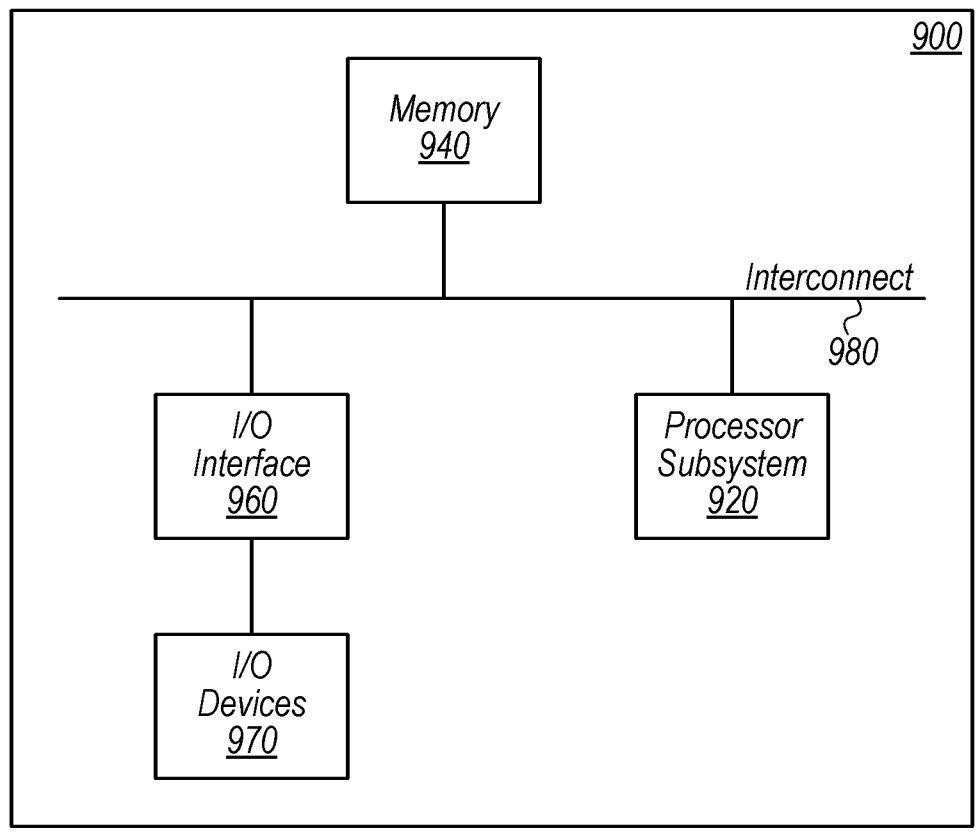
FIG. 9 is a block diagram illustrating an example computer system, according to some embodiments.

Referring now to FIG. 9, a block diagram of an example computer system 900 is depicted, which may implement one or more computer systems, such as server system 102 of FIG. 1, according to various embodiments. Computer system 900 includes a processor subsystem 920 that is coupled to a system memory 940 and I/O interfaces(s) 960 via an interconnect 980 (e.g., a system bus). I/O interface(s) 960 is coupled to one or more I/O devices 970. Computer system 900 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 900 is shown in FIG. 9 for convenience, computer system 900 may also be implemented as two or more computer systems operating together.

Processor subsystem 920 may include one or more processors or processing units. In various embodiments of computer system 900, multiple instances of processor subsystem 920 may be coupled to interconnect 980. In various embodiments, processor subsystem 920 (or each processor unit within 920) may contain a cache or other form of on-board memory.

System memory 940 is usable to store program instructions executable by processor subsystem 920 to cause system 900 perform various operations described herein. System memory 940 may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 900 is not limited to primary storage such as system memory 940. Rather, computer system 900 may also include other forms of storage such as cache memory in processor subsystem 920 and secondary storage on I/O devices 970 (e.g., a hard drive, storage array, etc.). In some embodiments, these other forms of storage may also store program instructions executable by processor subsystem 920.

I/O interfaces 960 may be any of various types of interfaces configured to couple to and communicate with other devices, according to various embodiments. In one embodiment, I/O interface 960 is a bridge chip (e.g., Southbridge) from a front-side to one or more back-side buses. I/O interfaces 960 may be coupled to one or more I/O devices 970 via one or more corresponding buses or other interfaces. Examples of I/O devices 970 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 970 includes a network interface device (e.g., configured to communicate over WiFi, Bluetooth, Ethernet, etc.), and computer system 900 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

In this disclosure, various "modules" operable to perform designated functions are shown in the figures and described in detail above (e.g., authentication module 104, prediction module 202, comparator 204, etc.). As used herein, the term "module" refers to circuitry configured to perform specified operations or to physical, non-transitory computer-readable media that stores information (e.g., program instructions) that instructs other circuitry (e.g., a processor) to perform specified operations. Such circuitry may be implemented in multiple ways, including as a hardwired circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory, computer-readable medium having instructions stored thereon that are executable by a computer system to perform operations comprising:
   receiving a request to authorize a transaction associated with a first user account, wherein the request includes:
   transaction details for the transaction; and
   interaction data, separate from the transaction details, indicative of a plurality of behaviors exhibited by a requesting user interacting with a first client device during a first user session corresponding to the request, wherein the interaction data represents actions performed by the requesting user and includes corresponding timestamp information;
   applying a first machine learning model to the interaction data to create a first encoding value that is based on the plurality of behaviors exhibited by the requesting user interacting with the first client device during the first user session;
   comparing the first encoding value to a reference encoding value, wherein the reference encoding value is based on prior interaction data indicative of a plurality of behaviors exhibited by an authorized user of the first user account interacting with the first client device during a prior user session; and
   based on the comparing, generating an output value indicating a similarity between the first encoding value and the reference encoding value.

2. The non-transitory, computer-readable medium of claim 1, wherein the first machine learning model is a Siamese artificial neural network.

3. The non-transitory, computer-readable medium of claim 1, wherein the operations further comprise:
   determining that the output value is below a particular threshold value; and
   denying the transaction based on the determining.

4. The non-transitory, computer-readable medium of claim 1, wherein the operations further comprise:
   identifying a device type of the first client device; and
   retrieving the first machine learning model, from a plurality of models, based on the device type of the first client device,
   wherein the first machine learning model was trained, prior to the first user session, using a training dataset that includes second interaction data indicative of a plurality of behaviors exhibited by a plurality of users while interacting, during a plurality of prior user sessions, with client devices of a same device type as the first client device.

5. The non-transitory, computer-readable medium of claim 1, wherein the operations further comprise:
generating a training dataset that includes second interaction data indicative of a plurality of behaviors exhibited by a plurality of users while interacting, during a plurality of prior user sessions, with client devices of a same device type as the first client device, wherein the training dataset includes a plurality of training examples, wherein a given one of the plurality of training examples includes:
a plurality of samples of interaction data corresponding to a second user; and
at least one sample of interaction data corresponding to a third user.

6. The non-transitory, computer-readable medium of claim 5, wherein the operations further comprise training the first machine learning model based on the training dataset using a triplet loss function.

7. The non-transitory, computer-readable medium of claim 1, wherein the operations further comprise:
generating the reference encoding value subsequent to the receiving the request to authorize the transaction.

8. The non-transitory, computer-readable medium of claim 1, wherein the interaction data includes one or more of the following types of interaction data:
information indicative of dwell time, during the first user session, on a particular portion of a webpage;
information indicative of a cursor position on the webpage during the first user session; and
information indicative of user input provided via the webpage during the first user session.

9. A method, comprising:
accessing, by a computer system, a training dataset that includes prior interaction data indicative of behaviors exhibited by a plurality of users while interacting, during a plurality of prior user sessions, with a particular type of client device, wherein the prior interaction data represents actions performed by ones of the plurality of users and includes corresponding timestamp information, wherein the training dataset includes a plurality of training examples, and wherein a given one of the plurality of training examples includes:
a first sample indicative of user interaction by a first user during a first user session;
a second sample indicative of user interaction by the first user during a second user session; and
a third sample indicative of user interaction by a second user during a third user session; and
training, by the computer system, a Siamese artificial neural network using the training dataset such that, after the training, the Siamese artificial neural network generates an encoding value based on behaviors exhibited by a given user interacting with the particular type of client device during a given user session.

10. The method of claim 9, wherein the training the Siamese artificial neural network includes using a triplet loss function to modify one or more parameters of the Siamese artificial neural network, wherein, for the given training example, the training includes:
generating output values based on the first, second, and third samples; and
modifying at least one of the one or more parameters so as to minimize a first distance between the output values based on the first and second samples and to maximize a second distance between the output values based on the first and third samples.

11. The method of claim 9, further comprising:
accessing, by the computer system, a second training dataset that includes second interaction data indicative of behaviors exhibited by a second plurality of users while interacting with a second type of client device during a second plurality of prior user sessions; and
training, by the computer system, a second Siamese artificial neural network using the second training dataset such that, after the training, the second Siamese artificial neural network is operable to generate an encoding value that is based on behaviors exhibited by a given user while interacting with the second type of client device during a second given user session.

12. The method of claim 9, further comprising:
subsequent to the training the Siamese artificial neural network, generating, by the computer system, a reference encoding value associated with a first user account, including by:
applying the Siamese artificial neural network to first interaction data indicative of behaviors exhibited by an authorized user of the first user account while interacting with a first client device during a first authorized user session, wherein the first client device is of the particular type of client device.

13. The method of claim 12, further comprising:
receiving, by the computer system, an authentication request to authenticate a requesting user of the first client device to the first user account, wherein the authentication request includes second interaction data indicative of behaviors exhibited by the requesting user while interacting with the first client device; and
applying, by the computer system, the Siamese artificial neural network to the second interaction data to generate a current encoding value that is based on the behaviors exhibited by the requesting user while interacting with the first client device.

14. The method of claim 13, further comprising:
determining, by the computer system, whether to authenticate the requesting user to the first user account, including by:
comparing the current encoding value to the reference encoding value associated with the first user account;
based on the comparing, generating an output value indicating a similarity between the current and reference encoding values; and
determining whether the output value is below a particular threshold value.

15. A method, comprising:
accessing, by a computer system, a training dataset that includes prior interaction data indicative of behaviors exhibited by a plurality of users while interacting with a particular type of client device during prior user sessions, wherein the prior interaction data represents actions performed by ones of the plurality of users and includes corresponding timestamp information;
training, by the computer system, a machine learning model based on the training dataset using a triplet loss function;
receiving, by the computer system, a request to authorize a transaction associated with a first user account, wherein the request includes:
transaction details for the transaction; and first interaction data, separate from the transaction details, indicative of behaviors exhibited by a requesting user interacting with a first client device during a first user session, wherein the first client device is of the particular type of client device;

applying, by the computer system, the machine learning model to the first interaction data to generate a first encoding value that is based on the behaviors exhibited by the requesting user interacting with the first client device during the first user session; and determining, by the computer system, whether to authorize the transaction based on the first encoding value.

16. The method of claim 15, wherein the determining whether to authorize the transaction includes:

retrieving a reference encoding value associated with the first user account;

comparing the first encoding value to the reference encoding value; and based on the comparing, generating an output value indicating a similarity between the first and reference encoding values.

17. The method of claim 16, further comprising:

generating, by the computer system, the reference encoding value prior to the receiving the request to authorize the transaction.

18. The method of claim 16, wherein the output value is one of a plurality of factors used to determine whether to authorize the transaction.

19. The method of claim 15, wherein the training dataset includes a plurality of training examples, wherein a given one of the plurality of training examples includes:

a first sample indicative of user interaction by a first user during a first training user session;

a second sample indicative of user interaction by the first user during a second training user session; and a third sample indicative of user interaction by a second user during a third training user session;

wherein the training the machine learning model includes modifying one or more parameters of the machine learning model.

20. The method of claim 19, wherein, for the given training example, the training includes:

generating output values based on the first, second, and third samples; and modifying at least one of the one or more parameters so as to minimize a first distance between the output values based on the first and second samples and to maximize a second distance between the output values based on the first and third samples.

* * * * *